United States Patent
Hurd et al.

(10) Patent No.: US 9,538,551 B2
(45) Date of Patent: Jan. 3, 2017

(54) ADMISSION CONTROL FOR CONTROL CHANNEL

(75) Inventors: Magnus Hurd, Stockholm (SE);
Pontus Arvidson, Stockholm (SE);
Robert Karlsson, Sundbyberg (SE);
Kai-Erik Sunell, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 420 days.

(21) Appl. No.: 14/362,159

(22) PCT Filed: Dec. 6, 2011

(86) PCT No.: PCT/SE2011/051478
§ 371 (c)(1),
(2), (4) Date: Aug. 26, 2014

(87) PCT Pub. No.: WO2013/085438
PCT Pub. Date: Jun. 13, 2013

(65) Prior Publication Data
US 2015/0036563 A1     Feb. 5, 2015

(51) Int. Cl.
*H04W 72/14* (2009.01)
*H04L 5/14* (2006.01)
(Continued)

(52) U.S. Cl.
CPC ......... *H04W 72/14* (2013.01); *H04W 72/1252* (2013.01); *H04W 72/1278* (2013.01);
(Continued)

(58) Field of Classification Search
CPC ............. H04W 72/14; H04W 72/1252; H04W 72/1278; H04W 28/16; H04W 72/1242; H04L 5/0053; H04L 5/14
See application file for complete search history.

(56) References Cited

U.S. PATENT DOCUMENTS

2006/0002318 A1    1/2006   Kuurne
2011/0299490 A1*  12/2011   Nordstrom ............ H04L 1/1861
                                                          370/329
2012/0309403 A1*  12/2012   Mekhail ............ H04W 72/1252
                                                          455/450

FOREIGN PATENT DOCUMENTS

WO      2010112085 A1    10/2010

OTHER PUBLICATIONS

Anas, M. et al. "Combined Admission Control and Scheduling for QoS Differentiation in LTE Uplink." IEEE 68th Vehicular Technology Conference, 2008, Sep. 21-24, 2008, pp. 1-5.

(Continued)

*Primary Examiner* — Melvin Marcelo
(74) *Attorney, Agent, or Firm* — Coats & Bennett, PLLC (57) ABSTRACT

Network node (110) and method (600) in a network node (110), for admission control of an additional radio access bearer based on load of control channel elements on a control channel, assigned by a scheduler (700) comprised in the network node (110). The method (600) comprises assigning (601), by the scheduler (700), control channel elements on the control channel for already admitted radio access bearers. Further, a first and a second load of the control channel is computed (606, 607) based on the usage of assigned control channel elements subframes on which both downlink assignments and uplink grants are enabled, and on which downlink assignments are enabled, respectively. If any of the first or second loads exceeds a respective threshold value, the radio access bearer to be admitted is rejected (609A).

12 Claims, 8 Drawing Sheets

(51) Int. Cl.
*H04L 5/00* (2006.01)
*H04W 72/12* (2009.01)
*H04W 28/16* (2009.01)

(52) U.S. Cl.
CPC .............. *H04L 5/0053* (2013.01); *H04L 5/14* (2013.01); *H04W 28/16* (2013.01); *H04W 72/1242* (2013.01)

(56) References Cited

OTHER PUBLICATIONS

Sas, B., et al., "Self-optimisation of admission control and handover parameters in LTE", 73rd Vehicular Technology Conference, May 15, 2011, pp. 1-6, IEEE.
3rd Generation Partnership Project, "3rd Generation Partnership Project; Technical Specification Group Radio Access Network; Evolved Universal Terrestrial Radio Access (E-UTRA); Physical layer procedures (Release 10)", 3GPP TS 36.213 V10.3.0, Sep. 1, 2011, pp. 71-75, 3GPP, France.

* cited by examiner

ADMISSION CONTROL FOR CONTROL CHANNEL

TECHNICAL FIELD

The present disclosure relates to a network node and a method in a network node. In particular, it relates to admission control of an additional radio access bearer based on load of control channel elements on a control channel, assigned by a scheduler comprised in the network node.

BACKGROUND

Network nodes, such as e.g. User Equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, e-readers, laptops with wireless capability etc. The user equipment units in the present context may be, for example, portable mobile devices, enabled to communicate voice and/or data wirelessly, via the radio access network, with another entity, such as a network node.

However, the network nodes herein discussed may comprise a base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, which may be referred to as enhanced Node Bs, eNodeBs or eNBs, may be connected via a gateway e.g. a radio access gateway, to one or more core networks.

The 3GPP is responsible for the standardization of LTE. LTE is a technology for realizing high-speed packet-based communication that may reach high data rates both in the downlink and in the uplink, and is thought of as a next generation mobile communication system relative UMTS.

Some embodiments discussed herein may fall into the area of Admission Control and Quality of Service (QoS) in particular for Time-Division Duplex (TDD) in LTE. TDD is an application of time-division multiplexing to separate uplink and downlink signals in time, possibly with a guard period situated in the time domain between the uplink and downlink signalling.

However, embodiments of the wireless communication system described herein may be configured to operate according to the Frequency Division Duplex (FDD) principle, according to different embodiments.

FDD means that the transmitter and receiver operate at different carrier frequencies. The subsequently described explanations and embodiments are exemplified in an FDD LTE environment, as a non-limiting example. However the methods and apparatuses may easily be generalized and applied to e.g. a TDD LTE system, and also to cellular systems other than based on the LTE standard, or in fact any other cell based access technology where in-band relaying may be applied.

The task of Admission Control is to admit or reject resource requests. In mobile radio communication systems, these establishment requests are made for new radio bearers. Admission control considers the overall resource situation, e.g. in the network nodes and infrastructure comprising both radio access network and core network, the Quality of Service (QoS) requirements, the priority levels and the provided QoS of in-progress sessions and the QoS requirement of the new radio bearer request.

In LTE air interface resources like Resource Blocks (RBs) for Physical Downlink Shared Channel/Physical Uplink Shared Channel (PDSCH/PUSCH) and Control Channel Elements (CCEs) are allocated to Evolved-Radio Access Bearers (E-RABs), or radio access bearers as they also may be referred to as. A prioritisation scheme may be used by the scheduler to make sure resources are assigned to E-RABs in accordance to their QoS requirements on sub-frame basis.

Of particular interest may be the situation when the resources comprising control channel elements are associated with Physical Downlink Control Channel (PDCCH) in TDD LTE.

A scheduler comprised within a network node, or eNodeB may try to assign resources to the QoS E-RABs to fulfil their QoS requirements. Whenever the scheduler is congested, it assigns resources such that the QoS requirements are fulfilled in the order indicated by the priority of the QoS E-RABs. There may be two aspects related to this way of prioritising with respect to QoS requirements.

Firstly, some E-RABs do not have any QoS requirements at all, so-called best-effort or non-Guaranteed Bit Rate (non-GBR) bearers. This means that scheduling may not consider those E-RABs in congested scenarios. Then there is a risk that this class of E-RABs is starved out since only E-RABs with specified QoS requirements are scheduled.

Secondly, if too many E-RABs with QoS requirements are admitted scheduling will at some point fail to provide resources to all of them. Users may have been admitted at a point in time when radio conditions and mobility were favourable in the sense that QoS could be provided. But due to increasing mobility and worsened radio conditions the resources may at a later point in time not be enough to provide QoS for the admitted E-RABs.

Those two aspects may be dealt with by an Admission Control function that monitors the resources handled by the scheduler. These resources are typically control channel elements of the PDCCH and resource blocks of PDSCH/PUSCH. Admission Control strives for having the load due to E-RABs with QoS requirements below a QoS threshold expressed as a percentage of the maximum amount of the resource. It does so by rejecting initial access whenever load due to E-RABs with QoS requirements is above the QoS threshold. The QoS threshold could for instance relate to the contribution from all the Guaranteed Bitrate Bearers (GBRs).

This kind of Admission Control may then assist in protecting E-RABs without any QoS requirements. It also allows for statistical fluctuations with regard to the air interface resources, since the load for high-priority traffic may be limited to a value lower than the maximum level of the resource. Then integrity of the QoS E-RABs may be protected with some level of probability since resources above the threshold are available for the high-prioritized traffic in congested scenarios. Tuning the threshold makes possible to adjust that probability. Tuning the margin between the threshold and the maximum level of the resource is of special interest when the high-prioritized traffic consists of GBR traffic where service blocking is desired rather than service dropping.

Figure 1A:
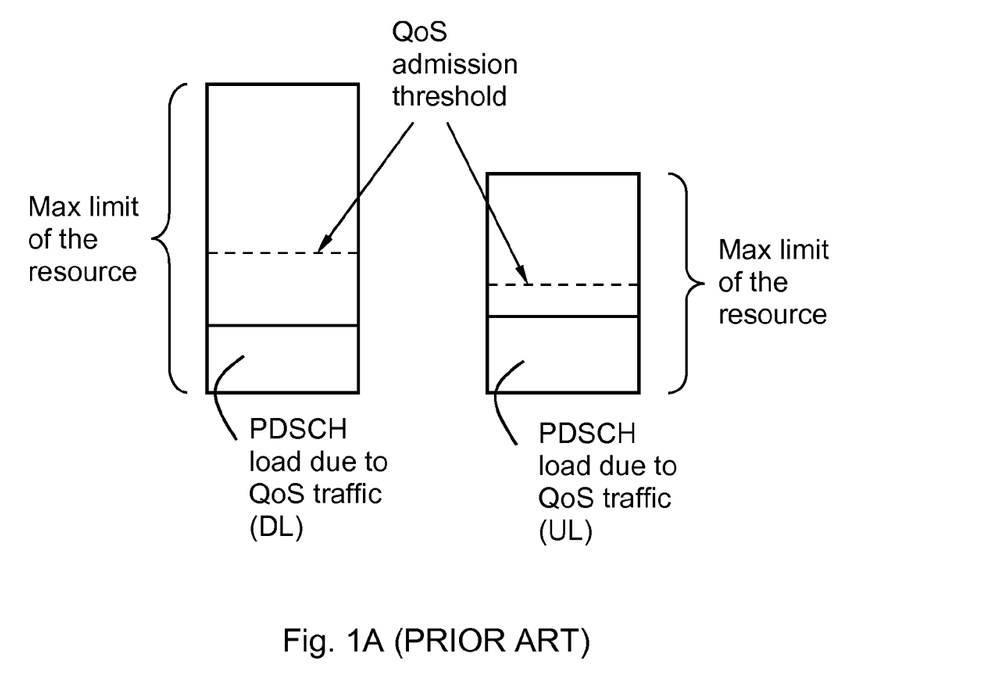
FIG. 1A is a schematic illustration of the load on PDSCH and PUSCH, on the downlink and the uplink respectively, according to prior art.

In FIG. 1A are the loads on different resources handled by scheduling in a FDD case illustrated. Whenever load on a resource exceeds its threshold, Admission Control rejects any E-RAB request with an associated QoS requirement.

The load is separately measured for each resource. This means one load measure for resource blocks utilization on PDSCH and PUSCH respectively. Moreover, since PDCCH is a common resource for both downlink (DL) and uplink (UL) in the sense that it transmits assignments for both PDSCH and PUSCH, control channel element utilisation on PDCCH are treated as one resource.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

In this disclosure the focus is on the control channel element resource in the case of TDD in LTE. It is however possible to generalise the method to any time division duplex wireless technology with a downlink control channel similar to PDCCH.

Figure 1B:
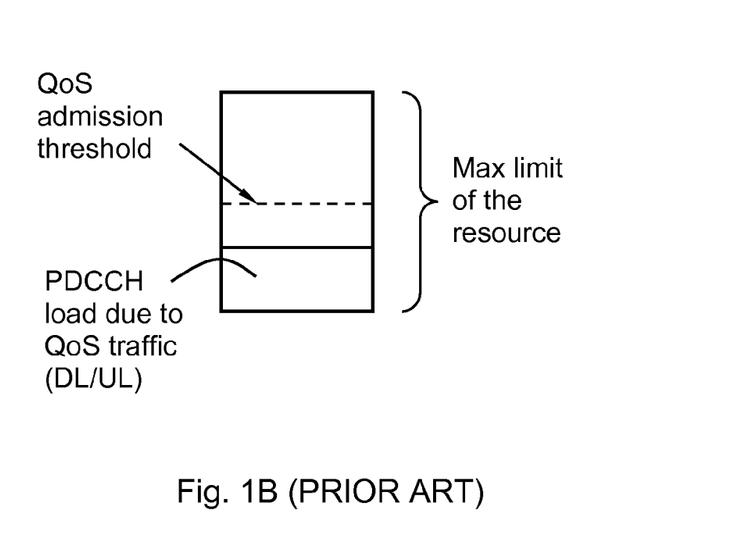
FIG. 1B is a schematic illustration of the load on PDCCH, both on the uplink and the downlink together, according to prior art.

In FIG. 1A and FIG. 1B, the load on different resources measured in percentage of maximum capacity for each specific resource is illustrated. The maximum limits for the various resources vary, but a QoS Admission threshold is configured as a percentage of the maximum limit.

For FDD, the PDCCH is a resource common to downlink and uplink since it is always, in every subframe, possible to transmit in both links. Then scheduling lets both downlink (requesting assignments) and uplink (requesting grants) to compete for these resources. The competition is based on a prioritization scheme where the priority of the user equipment is based on its E-RABs and their QoS requirements. An admission control function can then monitor the control channel element resource load due to E-RABs with QoS requirements as a resource common downlink and uplink.

This situation is however completely different for TDD. Firstly, simultaneous uplink and downlink transmission is not allowed. What subframes are for downlink and what subframes are for uplink is determined from the specific uplink-downlink configuration.

Second, PDCCH sent in a specific subframe always carry assignments for downlink transmission, but only for a subset of these subframes there are control channel elements carrying grants for uplink transmission.

To represent the control channel element utilisation in TDD LTE as one resource without considering there are different types of subframes with respect to whether downlink only or downlink/uplink combined are competing for PDCCH resources would be similar to combining the resource block utilisation of PDSCH and PUSCH (for downlink and uplink) as one resource. That way the Admission Control function would be out of touch as to how the different links are loading the scheduler, with regard to E-RABs with QoS requirements.

SUMMARY

It is therefore an object to obviate at least some of the above mentioned disadvantages and to improve the performance in a wireless communication system.

According to a first aspect, the object is achieved by a method in a network node. The method aims at providing admission control of an additional radio access bearer, based on load of control channel elements on a control channel. The control channel elements are assigned by a scheduler, which is comprised in the network node. The method comprises assigning, by the scheduler, control channel elements on the control channel for already admitted radio access bearers. Further, the method comprises accumulating a first number of assigned control channel elements belonging to subframes on which both downlink assignments and uplink grants are enabled during a time period. The method also comprises accumulating a first number of available control channel elements, belonging to subframes on which both downlink assignments and uplink grants are enabled during the time period. In addition, the method further comprises accumulating a second number of control channel elements assigned for downlink assignments, belonging to subframes on which downlink assignments are enabled during the time period. Additionally, the method comprises accumulating a second number of available control channel elements, belonging to subframes on which downlink assignments are enabled during the time period. Further the method comprises, when the time period is up, calculating a first load of the control channel by dividing the accumulated first number of assigned control channel elements with the accumulated first number of available control channel elements. Additionally, the method also comprises calculating a second load of the control channel by dividing the accumulated second number of assigned control channel elements with the accumulated second number of available control channel elements. Also, in further addition, the method also comprises comparing the calculated first load of the control channel with a first threshold value, and the calculated second load of the control channel with a second threshold value. In further addition when the first threshold value is exceeded by the first load or the second threshold value is exceeded by the second load, the method further also comprises rejecting the radio access bearer to be admitted.

According to a second aspect, the object is achieved by a network node. The network node aims at providing admission control of an additional radio access bearer, based on load of control channel elements on a control channel. The control channel elements are assigned by a scheduler, which is comprised in the network node. The network node comprises a scheduler for assigning channel elements on the control channel to a radio access bearer. Further, the network node comprises a processing circuitry, configured to accumulate a first number of assigned control channel elements on subframes on which both downlink assignments and uplink grants are enabled during a time period. In addition, the processing circuitry is also configured to accumulate a first number of available control channel elements belonging to subframes on which both downlink assignments and uplink grants are enabled during the time period. Furthermore, the processing circuitry is configured to accumulate a second number of control channel elements assigned for downlink assignments, belonging to subframes on which downlink assignments are enabled during the time period. Also, the processing circuitry is further configured to accumulate a second number of available control channel elements, belonging to subframes on which downlink assignments are enabled during the time period. Additionally, the processing circuitry is further configured to measure and determine when the time period is up. In further addition, the processing circuitry is also configured to calculate a first load of the control channel by dividing the accumulated first number of assigned control channel elements with the accumulated first number of available control channel elements. The processing circuitry is in further addition configured to calculate a second load of the control channel by dividing the accumulated second number of assigned control channel elements with the accumulated second number of available control channel elements. The processing circuitry, also, is furthermore configured to compare the calculated first load of the control channel with a first threshold value, and the calculated second load of the control channel with a second threshold value. Additionally, the processing circuitry is also configured to reject the radio access bearer when any of the first threshold value is exceeded by the first load or the second threshold value is exceeded by the second load.

Embodiments of the method and network node disclosed herein have the following advantage: it makes possible to have Admission Control with respect to PDCCH resources also for TDD LTE such that both the downlink and the uplink aspects of the resources represented by PDCCH is considered. The Admission Control function, according to embodiments, senses when the control channel element resource common to downlink and uplink is loaded; it also senses when the control channel element resource available to downlink is loaded.

Also since the aspect that downlink assignments may be issued in all subframes with PDCCH is considered, the load due to downlink assignments is not unnecessarily restricted by Admission Control.

As a result, Admission Control for E-RABs with QoS requirements is more accurate.

A further advantage of embodiments described herein is that it provides an algorithm, which may be utilised in a network node, independent of if it is running on FDD or TDD, which saves resources, as separate configurations do not have to be made and updated. Thereby, an improved performance within the wireless communication system is achieved.

Other objects, advantages and novel features will become apparent from the following detailed description of the present method and network node.

BRIEF DESCRIPTION OF THE DRAWINGS

The methods and network nodes are described in more detail with reference to attached drawings illustrating exemplary embodiments in which.

DETAILED DESCRIPTION

Embodiments herein are defined as a network node and a method in a network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 2:
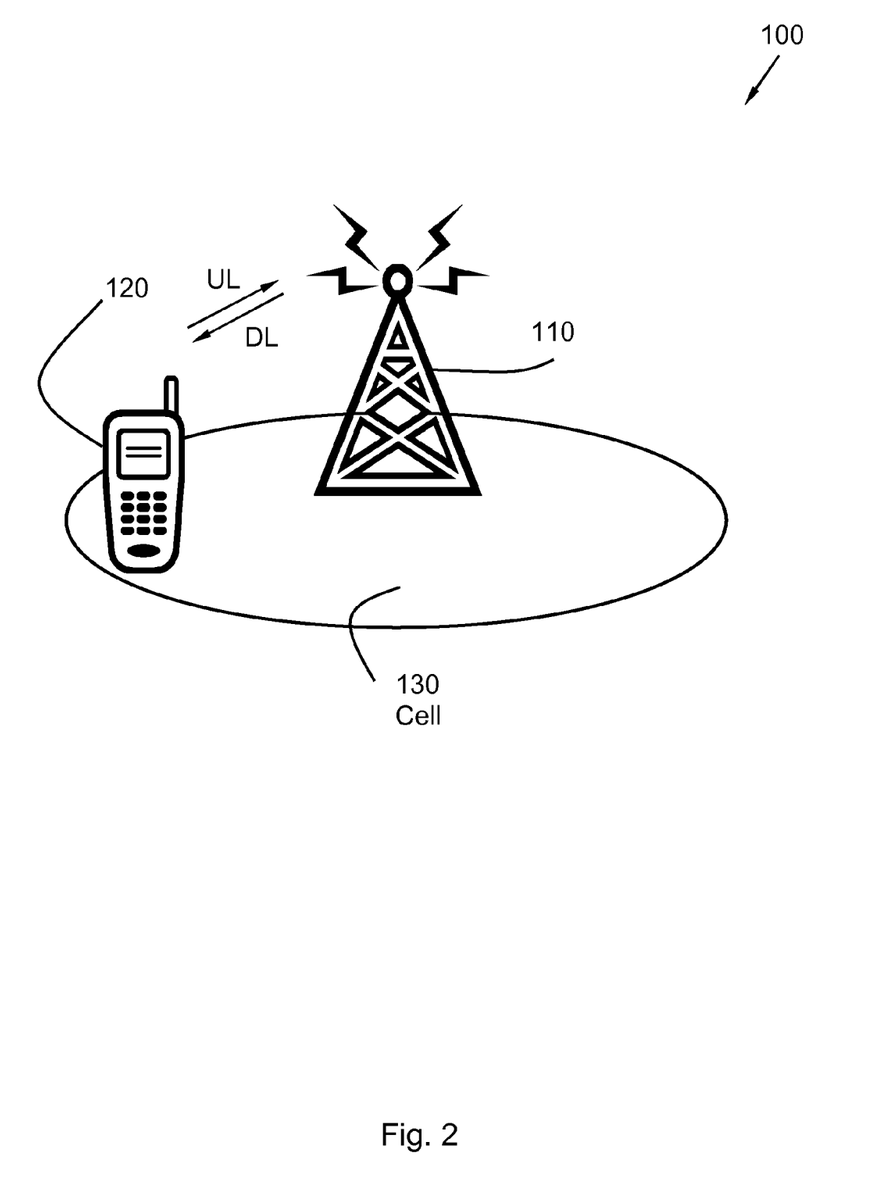
FIG. 2 is a schematic illustration of a wireless communication system for communicating data between the network node and user equipment, according to some embodiments.

FIG. 2 depicts a wireless communication system 100. The wireless communication system 100 may be based on technologies providing broadcasting information or data over a broadcast channel. Such technologies may at least partly comprise e.g. 3rd Generation Partnership Project (3GPP) Long Term Evolution (LTE), LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few exemplary options, suitable for transmission and/or broadcasting of wireless data.

The wireless communication system 100 comprises at least one network node 110. The network node 110 may be configured to transmit and/or receive uplink/downlink wireless signals to and from, respectively, user equipment 120 situated within a cell 130, served by the network node 110.

The network node 110 may be represented by e.g. a base station, a NodeB, an evolved Node B (eNB, or eNodeB), a base transceiver station, an Access Point Base Station, a base station router, a Radio Base Station (RBS), a macro base station, a micro base station, a pico base station, a femto base station, a Home eNodeB, a relay and/or a repeater, a sensor, a beacon device or any other kind of device configured to communicate wirelessly with the user equipment 120.

The user equipment 120 may be represented by e.g. a wireless communication terminal, a mobile cellular phone, a Personal Digital Assistant (PDA), a wireless platform, a mobile station, a portable communication device, an e-reader, a laptop, a computer, a wireless terminal acting as a relay, a relay node, a mobile relay, a Customer Premises Equipment (CPE), or similar device configured for wireless communication with the network node 110.

It is further to be noted that the illustrated network setting of the wireless communication system 100 in FIG. 2 is to be regarded as a non-limiting exemplary embodiment only. The wireless communication system 100 may comprise any other number and/or combination of network nodes 110 and user equipment 120 although only one instance of each entity of the network node 110 and the user equipment 120 are illustrated in FIG. 2 for clarity reasons.

Thus whenever "one" or "a/an" network node 110, or "one" or "a/an" user equipment 120 are referred to in the present context, a plurality of network nodes 110 and/or user equipment 120 may be involved, according to some embodiments.

The purpose of the illustration in FIG. 2 is to provide a simplified, general overview of the present method and the functionalities involved.

Some embodiments of the methods disclosed herein are directed towards a case when there are subframes for which there is no granting for PUSCH transmission by PDCCH. According to some embodiments, the Control Channel Elements (CCE) resource may be split into two different resources. One first resource represents a situation when downlink assignments may be posted on PDCCH and the other, second resource may represent a resource in a situation when both downlink assignments and uplink grants may be posted. This reflects how downlink and uplink competes for control channel elements resources from a subframe and scheduling point of view, and allows admission control to clearly understand the load situation for PDCCH regarding radio access bearers, or enhanced-radio access bearers (E-RABs) with Quality of Service (QoS) requirements.

These and other features of embodiments disclosed herein will be further explained in more detail subsequently.

Figure 3A:
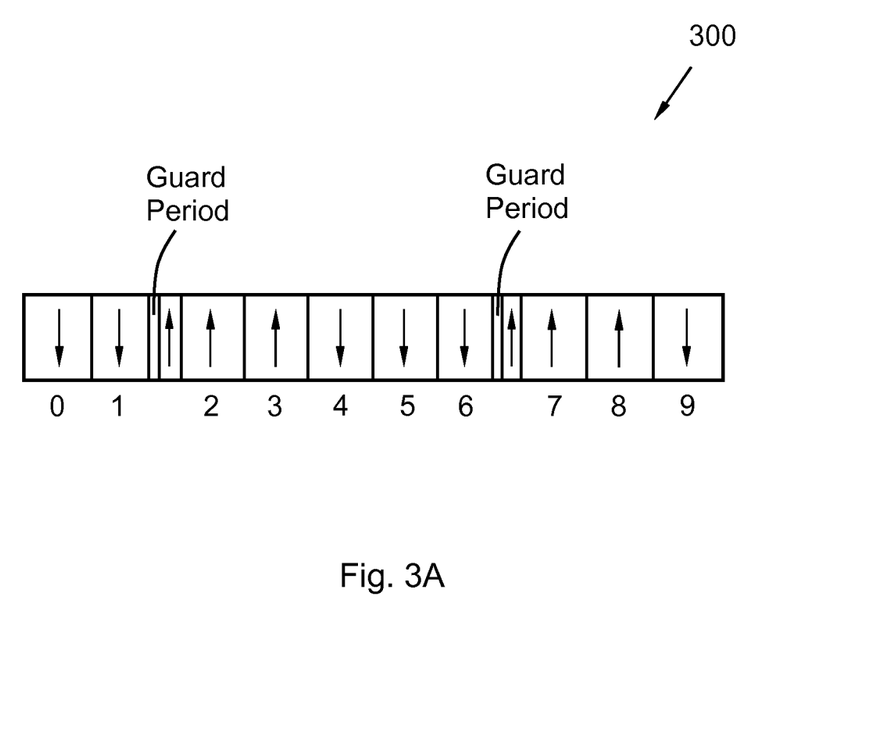
FIG. 3A is a schematic illustration of an uplink-downlink configuration for a frame structure, according to an embodiment.

FIG. 3A shows an example how subframes 0, 1, 2, 3, 4, 5, 6, 7, 8, 9 are organised for downlink and uplink transmission in TDD Frame Structure 300 for uplink-downlink configuration 1. Some portion of the time may be allocated for downlink transmission (arrows pointing down) and remaining parts of the time may be allocated for uplink transmission (arrows pointing up), except for the guard periods between downlink and uplink periods, for which there is no defined transmission. Other uplink-downlink configurations feature similar division in time with respect to downlink and uplink transmission.

PDCCH only transmits during time periods when downlink transmission occurs. During these periods of time, assignments for PDSCH transmission may be posted on PDCCH. However, posting of grants for PUSCH transmission only happens for some parts of the time when PDCCH are transmitted. The relation between posting a grant on PDCCH and the associated PUSCH transmission may comprise that, depending on uplink-downlink configuration that not all subframes 0, 1, 2, 3, 4, 5, 6, 7, 8, 9 with PDCCH resources shall issue grants. The relation between grant and following PUSCH transmission is reproduced in Table 1.

TABLE 1

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | | 7 | 7 | | 5 |

From Table 1 it may be seen that for the example shown in FIG. 3A, only subframes 1, 4, 6 and 9 are used to grant PUSCH transmission, whereas obviously 0, 1, 4, 5, 6 and 9 may be used to assign PDSCH transmission. This means Uplink-downlink configuration 1 is an example when there are subframes for which there is no granting for PUSCH transmission by PDCCH.

For these cases the control channel element resource is split into two different monitored resources instead of one common control channel element resource:

Resource Type DL+UL

The first common control channel element resource comprises both downlink and uplink assignment/grant. This first resource thus may represent control channel elements that PDCCH may provide both assignments in downlink and grants in uplink.

Resource Type DL

The second common control channel element resource comprises downlink assignments. Thus the second resource may represent control channel elements that PDCCH may provide assignments in downlink.

Figure 3B:
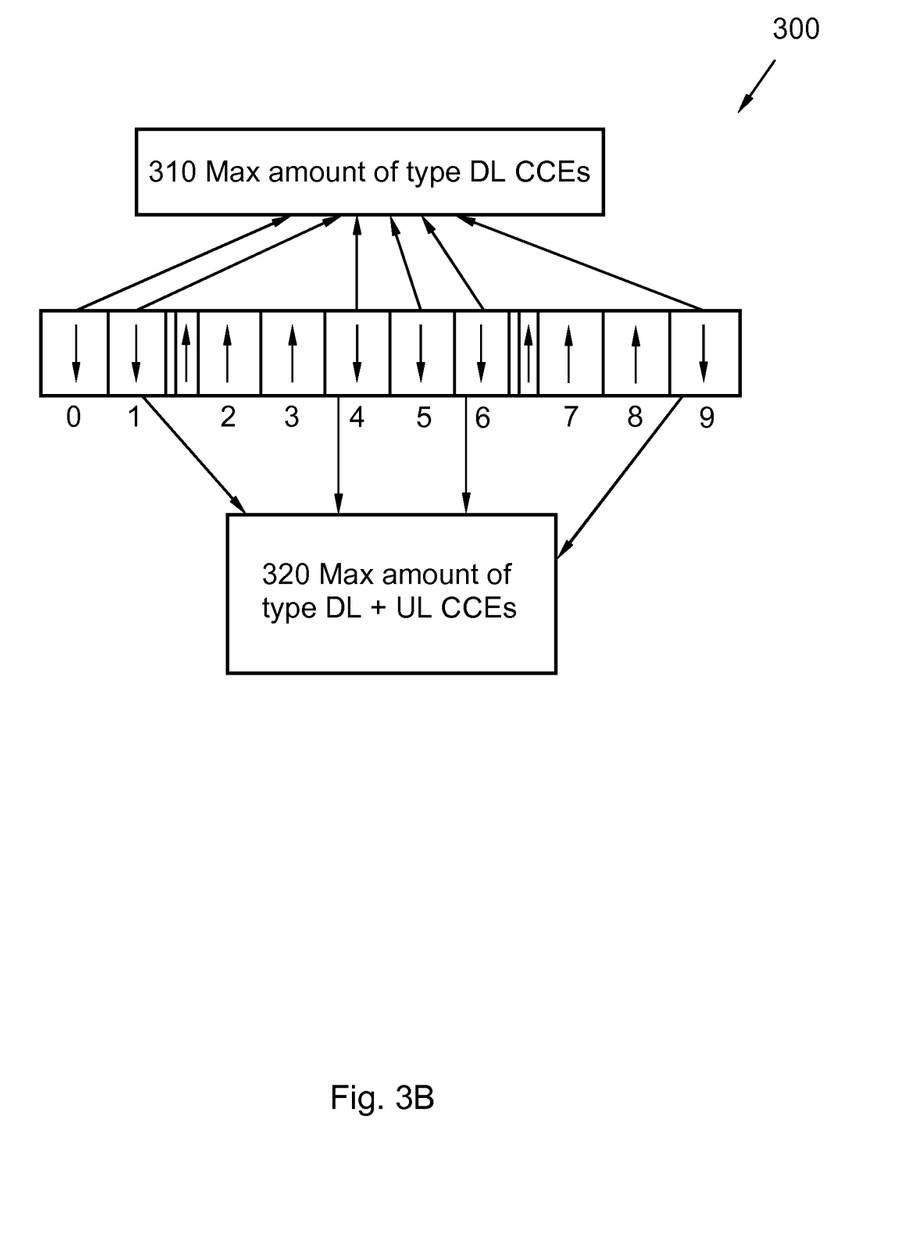
FIG. 3B is a schematic illustration of an uplink-downlink configuration for a frame structure, according to an embodiment.

The organisation into two different resource types, i.e. a first type for both downlink and uplink and a second type for downlink is shown in FIG. 3B, which also is illustrating an example of a frame structure 300. Each resource Type DL+UL and Type DL corresponds to a max amount of control channel elements. Thus a first resource type 310, comprising the max amount of control channel elements configured for downlink assignments may, in this example, be accumulated from subframes 0, 1, 4, 5, 6, 9. A second resource type 320, comprising the max amount of control channel elements configured for both downlink and uplink grant may, in this example, be accumulated from subframes 1, 4, 6, 9.

A specific control channel element belonging to a PDCCH of a specific subframe may then potentially contribute to the max amount of control channel elements for both resource types, according to some embodiments.

The utilisation of control channel elements may be realised according to some embodiments, by, for a period of time T, accumulating the total number N (DL+UL) of control channel elements available for Type DL+UL.

Also, during the same period of time T, accumulate the number X (DL+UL) of the Type DL+UL control channel elements that are used by user equipment scheduled because of the high priority of a radio access bearer with a QoS requirement.

Further, for a period of time T, the total number N (DL) of control channel elements available for Type DL may be accumulated. Also during the same period of time T, the number X (DL) of the Type DL control channel elements for downlink assignments that are used by user equipment 120 scheduled because of the high priority of a radio access bearer with a QoS requirement may be accumulated.

After the period T has expired the load L due to QoS radio access bearers may be calculated.

$$L = X/N$$

Thus, for Type DL+UL:

$$L(DL+UL) = X(DL+UL)/N(DL+UL)$$

and, for type DL:

$$L(DL) = X(DL)/N(DL)$$

Admission control may deal with many resources. However, herein admission control with the resources relevant for PDCCH is disclosed. A QoS threshold expressed as a percentage of the maximum amount of the resource may be utilised to evaluate whether a radio access bearer with a QoS requirement is to be admitted or not, according to some embodiments. If neither load DL or DL+UL due to QoS E-RABs are above the QoS Admission Threshold, the QoS radio access bearer request may be granted; otherwise, it may be rejected.

Figure 4:
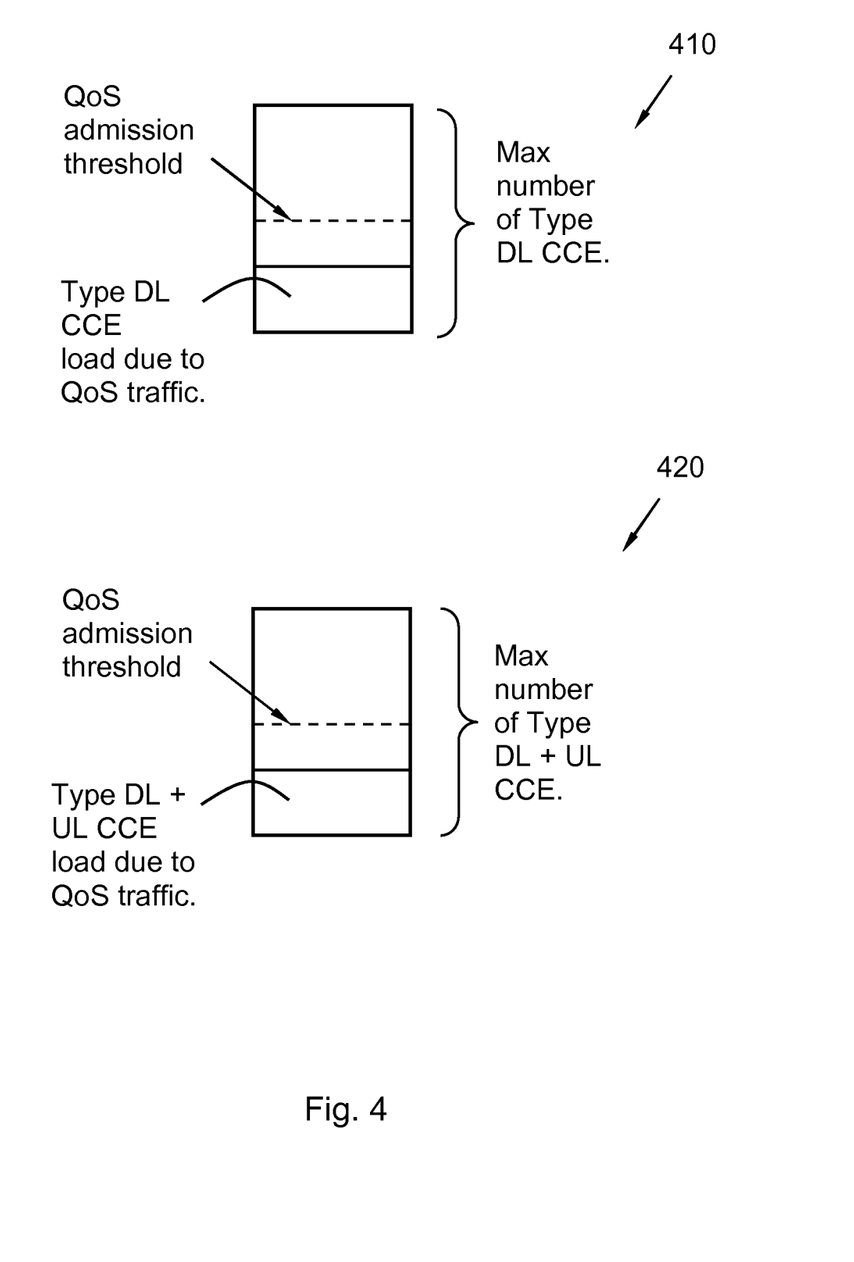
FIG. 4 is a schematic illustration of admission control with respect to load according to some embodiments.

FIG. 4 illustrates how the load in PDCCH may be controlled according to some embodiments. The prior art situation has previously been discussed and is illustrated in FIG. 1B.

However, according to some embodiments, the max number of type downlink control channel elements 410, and the max number of type downlink and uplink control channel elements 420 are separated, and different QoS admission control threshold values may be applied.

Figure 5:
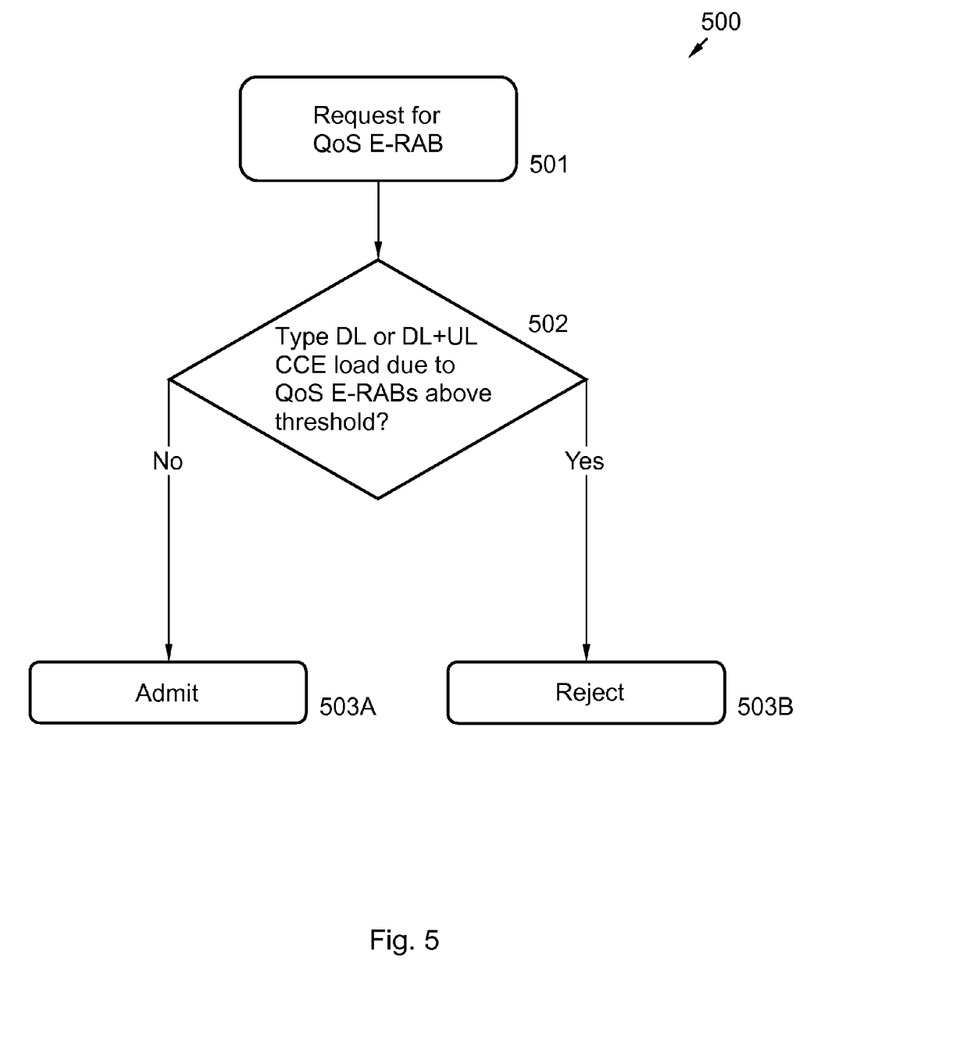
FIG. 5 is a schematic illustration of a flow chart illustrating principles of admission control functionality according to some embodiments.

FIG. 5 is a flow chart illustrating principles of a method 500 in a network node 110, according to some embodiments. The method 500 aims at providing admission control of an additional radio access bearer, based on load of control channel elements on a control channel, assigned by a scheduler 700, comprised in the network node 110.

In a first action 501, a request for a radio access bearer, such as e.g. a QoS E-RAB, is received.

In a second action 502, it is checked if any of the type downlink load 410, or the type downlink and uplink load 420 exceeds their respective threshold values, and if any of them is, the radio access bearer is rejected in an action 503B. Otherwise, of none of the threshold values are exceeded, the radio access bearer is admitted in an action 503A.

Figure 6:
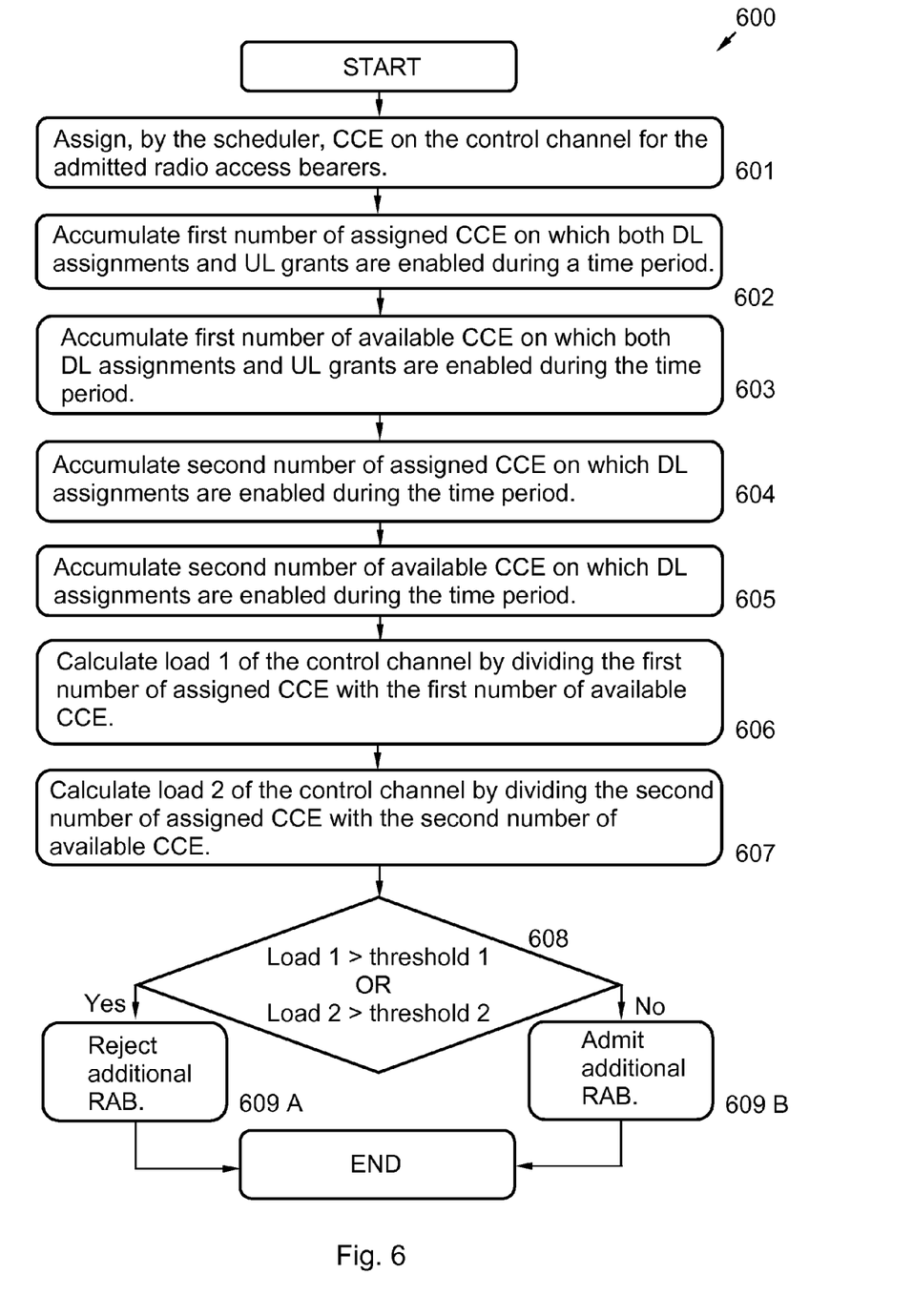
FIG. 6 is a schematic flow chart illustrating an example of an embodiment of a method in a network node.

FIG. 6 is a flow chart illustrating embodiments of a method 600 in a network node 110. The method 600 aims at providing admission control of an additional radio access bearer, based on load of control channel elements on a control channel, assigned by a scheduler 700. The scheduler 700 is comprised in the network node 110. The control channel may be e.g. a Physical Downlink Control Channel (PDCCH) and the network node 110 may be an enhanced Node B, according to some embodiments. The network node 110 may be comprised in a wireless communication system 100, which may be based on Long-Term Evolution (LTE) and configured for operating both in Time-Division Duplex, TDD, mode and Frequency-Division Duplex, FDD, mode. According to some embodiments, it may be determined if the network node 110 is operating in Time-Division Duplex, TDD, mode or Frequency-Division Duplex, FDD.

To appropriately providing admission control, the method 600 may comprise a number of actions 601-609A/609B.

It is however to be noted that some of the described actions, e.g. action 601-609A/609B may be performed in a somewhat different chronological order than the enumeration indicates. Further, any, some or all actions, such as e.g. 603 and 604 may be performed simultaneously or in a rearranged chronological order. Also, it is to be noted that some of the actions may be performed within some alternative embodiments, such as e.g. action 609A and 609B. The method 600 may comprise the following actions:

Action 601

The scheduler 700 assigns control channel elements on the control channel for already admitted radio access bearers.

Action 602

A first number of assigned control channel elements are accumulated, which assigned control channel elements belong to subframes on which both downlink assignments and uplink grants are enabled during a time period.

Action 603

A first number of available control channel elements are accumulated, which available control channel elements belong to subframes on which both downlink assignments and uplink grants are enabled during the time period.

Action 604

A second number of control channel elements assigned for downlink assignments, belonging to subframes on which downlink assignments are enabled during the time period are accumulated.

However, according to some embodiments, wherein it is determined that the network node 110 is operating in FDD mode, this action 604 may be disregarded.

Action 605

A second number of available control channel elements, belonging to subframes on which downlink assignments are enabled during the time period are accumulated.

However, according to some embodiments, wherein it is determined that the network node 110 is operating in FDD mode, this action 605 may be disregarded.

Action 606

A first load of the control channel is calculated, when the time period is up, by dividing the accumulated 602 first number of assigned control channel elements with the accumulated 603 first number of available control channel elements.

Action 607

A second load of the control channel is calculated, when the time period is up, by dividing the accumulated 604 second number of assigned control channel elements with the accumulated 605 second number of available control channel elements.

However, according to some embodiments, wherein it is determined that the network node 110 is operating in FDD mode, this action 607 may be disregarded.

Action 608

The calculated 606 first load of the control channel is compared with a first threshold value, and the calculated 607 second load of the control channel is compared with a second threshold value.

However, according to some embodiments, wherein it is determined that the network node 110 is operating in FDD mode, the comparison of the second load of the control channel with a second threshold value may be disregarded.

Action 609A

This action may be comprised within some embodiments, when the first threshold value is exceeded by the first load or the second threshold value is exceeded by the second load.

The radio access bearer to be admitted is rejected.

According to some embodiments, the number of rejections may be counted by admission control, of radio access bearers that have been made over a second period of time, and if the counted number of rejections exceeds a third threshold value, the first threshold value and/or the second threshold value may be increased. Thereby an adjustment mechanism of the first threshold value and/or the second threshold value/s is provided, enabling adjustment and/or fine tuning of adjustment of the threshold values without human interference, which saves working time.

However, according to some embodiments, the first threshold value and/or the second threshold value may be adjusted by counting the number of control channel elements the scheduler 700 was not able to assign 601 to radio access bearers due to congestion over a third period of time. Thus, if the counted number of control channel elements not possible to assign 601 to radio access bearers, by the scheduler 700, exceeds a fourth threshold value, the first threshold value and/or the second threshold value may be decreased.

Action 609B

This action may be comprised within some embodiments, when the first load is lower than the first threshold value and the second load is lower than the second threshold value.

The radio access bearer is admitted.

Figure 7:
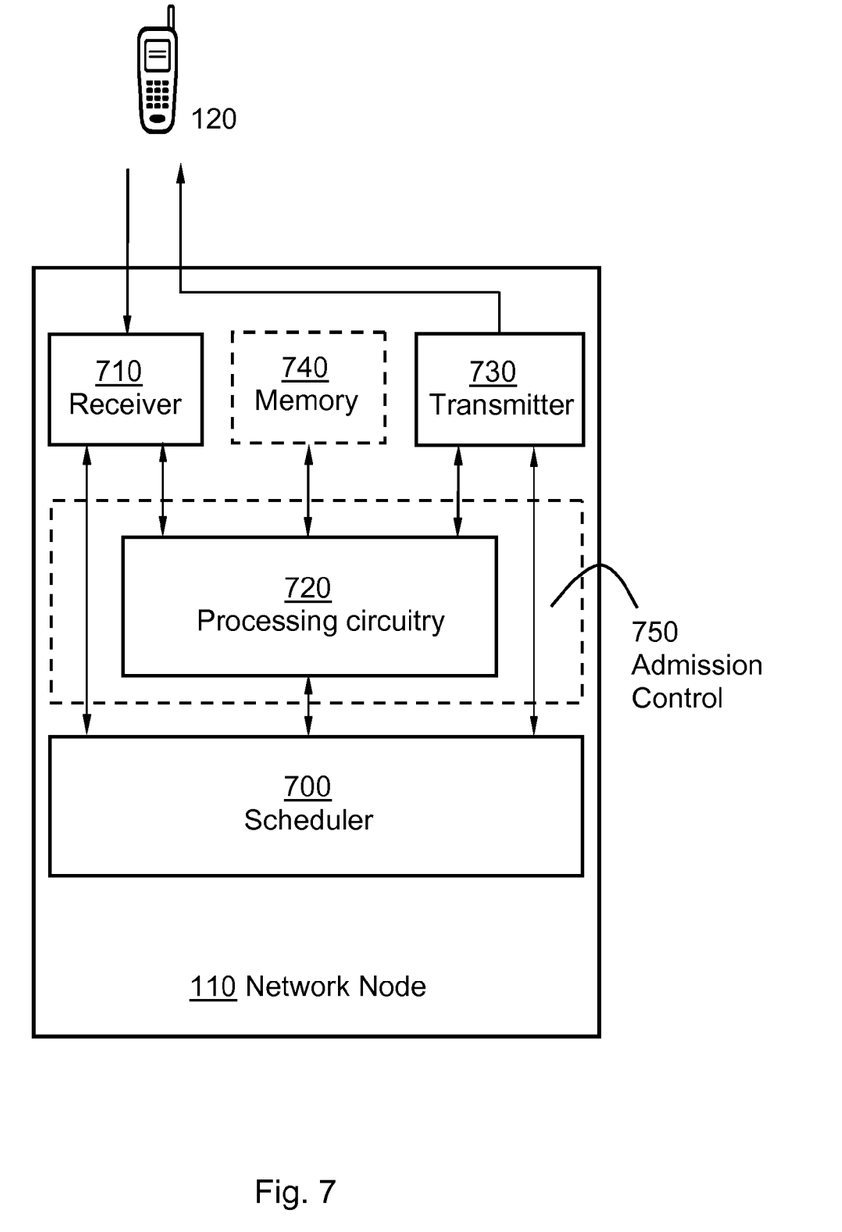
FIG. 7 is a schematic block diagram illustrating an example of an embodiment of a network node.

FIG. 7 is a block diagram illustrating a network node 110. The network node 110 may be configured to perform any, some or all of the previously described actions 601-609A/609B for admission control of an additional radio access bearer based on load of control channel elements on a control channel, assigned by a scheduler 700 comprised in the network node 110.

The control channel may be a Physical Downlink Control Channel (PDCCH) according to some embodiments. The network node 110 may be an enhanced Node B, operating in a wireless communication system 100 based on Long-Term Evolution (LTE), configured for operating both in Time-Division Duplex mode and Frequency-Division Duplex mode.

For the sake of clarity, any internal electronics or other components of the network node 110, not completely required for understanding the disclosed method 600 has been omitted from FIG. 7.

In order to perform the actions 601-609A/609B correctly, the network node 110 comprises a scheduler 700 for assigning channel elements on the control channel to a radio access bearer.

Further, the network node 110 comprises a processing circuitry 720, configured to accumulate a first number of assigned control channel elements on subframes on which both downlink assignments and uplink grants are enabled during a time period. The processing circuitry 720 is further configured to accumulate a first number of available control channel elements belonging to subframes on which both downlink assignments and uplink grants are enabled during the time period. Also, the processing circuitry 720 is configured to accumulate a second number of control channel elements assigned for downlink assignments, belonging to subframes on which downlink assignments are enabled during the time period. In addition, the processing circuitry 720 is configured to accumulate a second number of available control channel elements, belonging to subframes on which downlink assignments are enabled during the time period. Also, in further addition, the processing circuitry 720 is configured to measure and determine when the time period is up. Furthermore, the processing circuitry 720 is configured to calculate a first load of the control channel by dividing the accumulated first number of assigned control channel elements with the accumulated first number of available control channel elements. The processing circuitry 720 is also, in addition, configured to calculate a second load of the control channel by dividing the accumulated second number of assigned control channel elements with the accumulated second number of available control channel elements. Further, the processing circuitry 720 is configured to compare the calculated first load of the control channel with a first threshold value, and the calculated second load of the control channel with a second threshold value. Also, the processing circuitry 720 is further configured to reject the radio access bearer when any of the first threshold value is exceeded by the first load or the second threshold value is exceeded by the second load.

The processing circuitry 720 may further be configured to admit the radio access bearer when the first load is lower than the first threshold value and the second load is lower than the second threshold, according to some embodiments.

The processing circuitry 720 may further, according to some embodiments be configured to determine if the network node 110 is operating in Time-Division Duplex, TDD, mode or Frequency-Division Duplex, FDD, and if it is determined that the network node 110 is operating in FDD mode, the processing circuitry 720 may disregard actions concerning accumulation of the second number of assigned control channel elements, belonging to subframes on which downlink assignments are enabled during the time period, and also disregard any action of accumulation of the second number of available control channel elements, belonging to subframes on which downlink assignments are enabled during the time period. Further, the processing circuitry 720 may disregard actions concerning calculation of the second load of the control channel by dividing the accumulated second number of assigned control channel elements with the accumulated second number of available control channel elements, and of comparison of the calculated second load of the control channel with the second threshold value, according to such embodiments in FDD mode.

The processing circuitry 720 may in addition be configured to adjust the first threshold value and/or the second threshold value by counting the number of rejections, by the admission control, that have been made over a second period of time, and to increase the first threshold value and/or the second threshold value if the counted number of rejections exceeds a third threshold value, according to some embodiments.

Further, according to some embodiments, the processing circuitry 720 may also be configured to adjust the first threshold value and/or the second threshold value by counting the number of control channel elements the scheduler 700 was not able to assign to radio access bearers due to congestion over a third period of time, and to decrease the first threshold value and/or the second threshold value if the counted number of control channel elements not possible to assign to radio access bearers by the scheduler 700 exceeds a fourth threshold value.

The processing circuitry 720 may comprise e.g. one or more instances of a Central Processing Unit (CPU), a processing unit, a processor, a microprocessor, an Application Specific Integrated Circuit (ASIC) or other processing logic that may interpret and execute instructions. The processing circuitry 720 may further perform data processing functions for inputting, outputting, and processing of data comprising data buffering and device control functions, such as call processing control, user interface control, or the like.

In addition, the network node 110 may comprise a memory 740. The memory 740 may be configured to buffer e.g. accumulated data, accumulated number of control channel elements, computational results, threshold values, and other data. Further, according to some embodiments, the memory 740 may be configured to store other information that may serve the herein discussed methods 600, according to some embodiments.

In addition the network node 110 may comprise a receiver 710. The receiver 710 may be configured to receive wireless signals from the user equipment 120.

Also, in addition, the network node 110 may comprise a transmitter 730, configured to transmit wireless signals, to be received by any user equipment 120 situated within the cell 130, served by the network node 110.

Furthermore, the network node 110 may comprise an admission control 750, which in turn may comprise the processing circuitry 720, according to some embodiments. The admission control 750 may be concerned with admitting and/or rejecting resource requests.

Further, it is to be noted that some of the described units 710-750 comprised within the network node 110 in the wireless communication system 100 are to be regarded as separate logical entities but not with necessity separate physical entities.

The actions 601-609A/609B to be performed in the network node 110 may be implemented through one or more processing circuitry 720 in the network node 110, together with computer program code for performing any, some or all of the functions of the actions 601-609A/609B described above. Thus a computer program product, comprising instructions for performing the actions 601-609A/609B in the network node 110 may perform admission control of an additional radio access bearer based on load of control channel elements on a control channel, assigned by a scheduler 700 comprised in the network node 110, when being loaded into the one or more processing circuitry 720.

The computer program product mentioned above may be provided for instance in the form of a data carrier carrying computer program code for performing at least some of the actions 601-609A/609B according to some embodiments when being loaded into the processing circuitry 720. The data carrier may comprise e.g. a hard disk, a CD ROM disc, a memory stick, an optical storage device, a magnetic storage device or any other appropriate medium comprising a persistent or non-persistent memory such as a disk or tape that may hold machine readable data. The computer program product may furthermore be provided as computer program code on a server and downloaded to the network node 110 remotely, e.g. over an Internet or an intranet connection, according to some embodiments.

When using the formulation "comprise" or "comprising" within the present context, it is to be interpreted as non-limiting, i.e. meaning "consist at least of". The present methods and arrangements are not limited to the above described preferred embodiments. Various alternatives, modifications and equivalents may be utilized. Therefore, the above embodiments are not to be taken as limiting the scope of claimed protection, which instead is to be defined by the appending claims.

The invention claimed is:

1. A method, in a network node, for admission control of an additional radio access bearer based on load of control channel elements on a control channel, assigned by a scheduler comprised in the network node, the method comprising:
   assigning, by the scheduler, control channel elements on the control channel for already admitted radio access bearers;
   accumulating a first number of assigned control channel elements belonging to subframes on which both downlink assignments and uplink grants are enabled during a time period;
   accumulating a first number of available control channel elements, belonging to subframes on which both downlink assignments and uplink grants are enabled during the time period;
   accumulating a second number of control channel elements assigned for downlink assignments, belonging to subframes on which downlink assignments are enabled during the time period;
   accumulating a second number of available control channel elements, belonging to subframes on which downlink assignments are enabled during the time period;
   thereafter, when the time period is up:
      calculating a first load of the control channel by dividing the accumulated first number of assigned control channel elements with the accumulated first number of available control channel elements;
      calculating a second load of the control channel by dividing the accumulated second number of assigned control channel elements with the accumulated second number of available control channel elements;
      comparing the calculated first load of the control channel with a first threshold value, and the calculated second load of the control channel with a second threshold value;
   rejecting the additional radio access bearer in response to at least one of the following being true:
      the first load exceeds the first threshold value;
      the second load exceeds the second threshold value.

2. The method of claim 1, further comprising admitting the additional radio access bearer in response to both of the first load being is lower than the first threshold value and the second load being lower than the second threshold value.

3. The method of claim 1, further comprising:
   determining if the network node is operating in Time-Division Duplex (TDD) mode or a Frequency-Division Duplex (FDD) mode;
   in response to determining that the network node is operating in FDD mode, rejecting the additional radio access bearer only if the first load exceeds the first threshold value.

4. The method of claim 1, further comprising adjusting at least one of the first threshold value and the second threshold value by:
   counting a number of rejections, by admission control, of radio access bearers that have been made over a second period of time;
   in response to the counted number of rejections exceeding a third threshold value, increasing at least one of the first threshold value and the second threshold value.

5. The method of claim 1, further comprising adjusting at least one of the first threshold value and the second threshold value by:
   counting a number of control channel elements the scheduler was not able to assign to radio access bearers due to congestion over a third period of time
   in response to the counted number of control channel elements not possible to assign to radio access bearers by the scheduler exceeds a fourth threshold value, decreasing at least one of the first threshold value and the second threshold value.

6. The method of claim 1, wherein:
   the control channel is a Physical Downlink Control Channel (PDCCH);
   the network node is an enhanced NodeB operating in a wireless communication system based on Long-Term Evolution (LTE) and configured for operating both in a Time-Division Duplex (TDD) mode and a Frequency-Division Duplex (FDD) mode.

7. A network node, for admission control of an additional radio access bearer based on load of control channel elements on a control channel, assigned by a scheduler comprised in the network node, the network node comprising:
   a scheduler configured to assign channel elements on the control channel to a radio access bearer;
   processing circuitry operatively connected to the scheduler and configured to:
      accumulate a first number of assigned control channel elements on subframes on which both downlink assignments and uplink grants are enabled during a time period;
      accumulate a first number of available control channel elements belonging to subframes on which both downlink assignments and uplink grants are enabled during the time period;
      accumulate a second number of control channel elements assigned for downlink assignments, belonging to subframes on which downlink assignments are enabled during the time period;
      accumulate a second number of available control channel elements, belonging to subframes on which downlink assignments are enabled during the time period;
      determine when the time period is up, and in response thereto:
         calculate a first load of the control channel by dividing the accumulated first number of assigned control channel elements with the accumulated first number of available control channel elements;
         calculate a second load of the control channel by dividing the accumulated second number of assigned control channel elements with the accumulated second number of available control channel elements;
         compare the calculated first load of the control channel with a first threshold value, and the calculated second load of the control channel with a second threshold value;
      reject the radio access bearer in response to at least one of the following being true:
         the first load exceeds the first threshold value;
         the second load exceeds the second threshold value.

8. The network node of claim 7, wherein the processing circuitry is further configured to admit the radio access bearer when the first load is lower than the first threshold value and the second load is lower than the second threshold.

9. The network node according to claim 7, wherein the processing circuitry is further configured to:
   determine if the network node is operating in Time-Division Duplex (TDD) mode or a Frequency-Division Duplex (FDD);
   in response to determining that the network node is operating in FDD mode, reject the additional radio access bearer only if the first load exceeds the first threshold value.

10. The network node of claim 7, wherein the processing circuitry is further configured to adjust at least one of the first threshold value and the second threshold value by:
   counting a number of rejections, by admission control, that have been made over a second period of time;
   increase at least one of the first threshold value and the second threshold value in response to the counted number of rejections exceeding a third threshold value.

11. The network node of claim 7, wherein the processing circuitry is further configured to adjust at least one of the first threshold value and the second threshold value by:
   counting a number of control channel elements the scheduler was not able to assign to radio access bearers due to congestion over a third period of time;
   decrease at least one of the first threshold value and the second threshold value in response to the counted number of control channel elements not possible to assign to radio access bearers by the scheduler exceeding a fourth threshold value.

12. The network node of claim 7, wherein:
   the control channel is a Physical Downlink Control Channel (PDCCH);
   the network node is an enhanced NodeB operating in a wireless communication system based on Long-Term Evolution (LTE) and configured for operating both in a Time-Division Duplex (TDD) mode and a Frequency-Division Duplex (FDD) mode.

* * * * *